United States Patent
Meeks et al.

(10) Patent No.: US 8,868,485 B2
(45) Date of Patent: Oct. 21, 2014

(54) DATA FLOW COST MODELING

(75) Inventors: David T. Meeks, Ashland, MA (US); Michael J. Morton, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/161,726

(22) Filed: Jun. 16, 2011

(65) Prior Publication Data

US 2012/0323840 A1    Dec. 20, 2012

(51) Int. Cl.
*G06F 17/30* (2006.01)
*G06Q 10/10* (2012.01)
*G06Q 10/06* (2012.01)

(52) U.S. Cl.
CPC .......... *G06Q 10/06* (2013.01); *G06F 17/30569* (2013.01); *G06F 17/30563* (2013.01); *G06F 17/30595* (2013.01); *G06Q 10/10* (2013.01)
USPC ...................................... 707/602

(58) Field of Classification Search
USPC ...................................... 707/602
See application file for complete search history.

(56) References Cited

U.S. PATENT DOCUMENTS

| | | | |
|---|---|---|---|
| 5,801,943 A * | 9/1998 | Nasburg | 701/117 |
| 2002/0123957 A1* | 9/2002 | Notarius et al. | 705/37 |
| 2003/0014270 A1 | 1/2003 | Qureshi et al. | |
| 2003/0078831 A1 | 4/2003 | Kuettner et al. | |
| 2005/0159973 A1* | 7/2005 | Krause et al. | 705/1 |
| 2008/0262991 A1* | 10/2008 | Kapoor et al. | 706/20 |

OTHER PUBLICATIONS

Min, Hokey, Application of a Decision Support System to Strategic Warehousing Decisions, International Journal of Physical Distribution & Logistics Management, 2009, pp. 270-281, vol. 39, No. 4, Emerald Group Publishing Limited, Bingley, Bradford, United Kingdom.

Christopher, Martin et al., Supply Chain Cost Management and Value-Based Pricing, Industrial Marketing Management, Feb. 2005, pp. 115-121, vol. 34, Issue 2, Elsevier Inc., Kidlington, Oxfordshire, United Kingdom.

UPS, Supply Chain Value—Three Principles to Obtain More From Your Supply Chain Initiatives, 2005, United Parcel Services of America, Inc., Atlanta, GA, United States.

Aberdeen Group, Supply Chain Cost-Cutting Strategies: How Top Process Industry Performers Take Radically Different Actions, Mar. 2007, Aberdeen Group, Inc., Boston, MA, United States.

Dooley, Brian, Using Activity Based Costing Techniques to Drive Supply Chain Process Improvement and Business Profitability, Supply Chain Europe, Mar./Apr. 2007, pp. 32 and 34-35, vol. 16, No. 02, Via Media Ltd., Surrey, United Kingdom.

* cited by examiner

*Primary Examiner* — Kuen Lu
(74) *Attorney, Agent, or Firm* — Patterson & Sheridan, LLP (57) ABSTRACT

Techniques are disclosed for cost modeling in a data flow model. In one embodiment, a data flow model is provided that includes multiple data flow objects, each data flow object including one or more data units. Each data flow object represents a respective information asset. Quality and cost components are assigned to each data unit of a first data flow object. A cost property is determined for each data unit of the first data flow object, based on the assigned components. An object cost property is also determined for the first data flow object. The determined cost properties may be used to identify information assets that are more cost-effective to upgrade, relative to other information assets.

20 Claims, 4 Drawing Sheets

DATA FLOW COST MODELING

BACKGROUND

Organizations commonly manage large-scale information systems, which can include a very large number of both interrelated and independent information assets. While information assets can vary in nature, examples include structured systems such as traditional relational databases as well as unstructured systems such as content repositories and document stores. The degree of formality with which these systems are monitored, registered and/or managed can vary extensively within a large enterprise. It is not unusual for a large enterprise to manage thousands of distinct information repositories along with a (sometimes unknown) number of ad-hoc data stores and local working environments, which can themselves also number in the thousands. As noted, the information assets of a given enterprise may often be interdependent. For example, one information asset may store data extracts from another information asset. Similarly, information assets can share processing states during data integration (or during extract, transform and load (ETL) processes) or provide related information repositories which store equivalent information segmented by line of business, and so on.

SUMMARY

Embodiments of the invention provide a computer-implemented method, computer program product and system for performing an operation that includes receiving a data flow model comprising a plurality of data flow objects, each data flow object including one or more data units. Each data unit is retrievable based on respective, predefined criteria. The operation also includes assigning a quality component to a first data unit of a first data flow object of the plurality of data flow objects, where the quality component characterizes data quality in the first data unit. The operation also includes assigning a cost component to the first data unit of the first data flow object, where the cost component characterizes a costliness of inadequate data quality in the first data unit. The operation also includes determining a cost property to assign to the data flow object, based on the quality component and the cost component.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for capturing and/or modeling costs associated with information assets. As used herein, an information asset refers to any form of information technology used by a given organizational entity, e.g., application servers, databases and underlying tables and columns, data models, functions, jobs, scripts, ETL tools or processes, reports, network services, other server systems and applications, networking devices, appliance systems, etc. A cost of an information asset refers to an estimated expenditure or loss of an organizational entity as a result of inadequate data quality of the information asset. The extent to which data quality is inadequate may be measured based on one or more data quality rules defined by the user. In some embodiments, the cost may be represented as a monetary cost that is measured in any virtual or real currency. The cost may also be measured in terms of any arbitrary unit directly or indirectly associated with expenses incurred by an organizational entity, such as storage space, processing time, skilled or unskilled labor, any combination thereof, etc. In some embodiments, the arbitrary unit may be viewed as a proxy for monetary cost.

One embodiment provides an application for modeling costs. The application generates a data flow model that includes a plurality of data flow objects. Each data flow object represents an information asset, and the data flow model represents data being transferred between information assets. At least in some embodiments, the data flow model may be programmatically generated based on database and/or application metadata. In other embodiments, the data flow model may be generated based on user input. Each data flow object includes one or more data units, each data unit representing a subset of data stored and/or accessed by the information asset and being identifiable based on respective criteria.

In one embodiment, the application generates a cost property for each data unit in a data flow. The cost property for each data unit may be determined based on a predefined formula and from at least two components. The at least two components include a first component characterizing a data quality of the respective data unit and a second component characterizing a data cost of the respective data flow unit. In one embodiment, the predefined formula specifies to multiply the first component by the second component to obtain the cost property. The application may also determine a cost property of a data flow object, based on the determined cost properties of the data units of the data flow object. Based on the cost properties, the application or a user may advantageously identify which information assets are costlier than others, in terms of impact of poor data quality. Accordingly, the application(s) generating the information asset may be updated, upgraded and/or replaced, to improve the data quality of the information asset and thereby reduce the costliness of the information asset. The cost properties may be used to identify which applications are more cost effective to update than others, in terms of reducing costliness of information assets.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java Smalltalk C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the information assets and/or associated cost properties may be stored in the cloud. Having the information assets stored in the cloud allows the user to access the information assets and associated cost properties from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
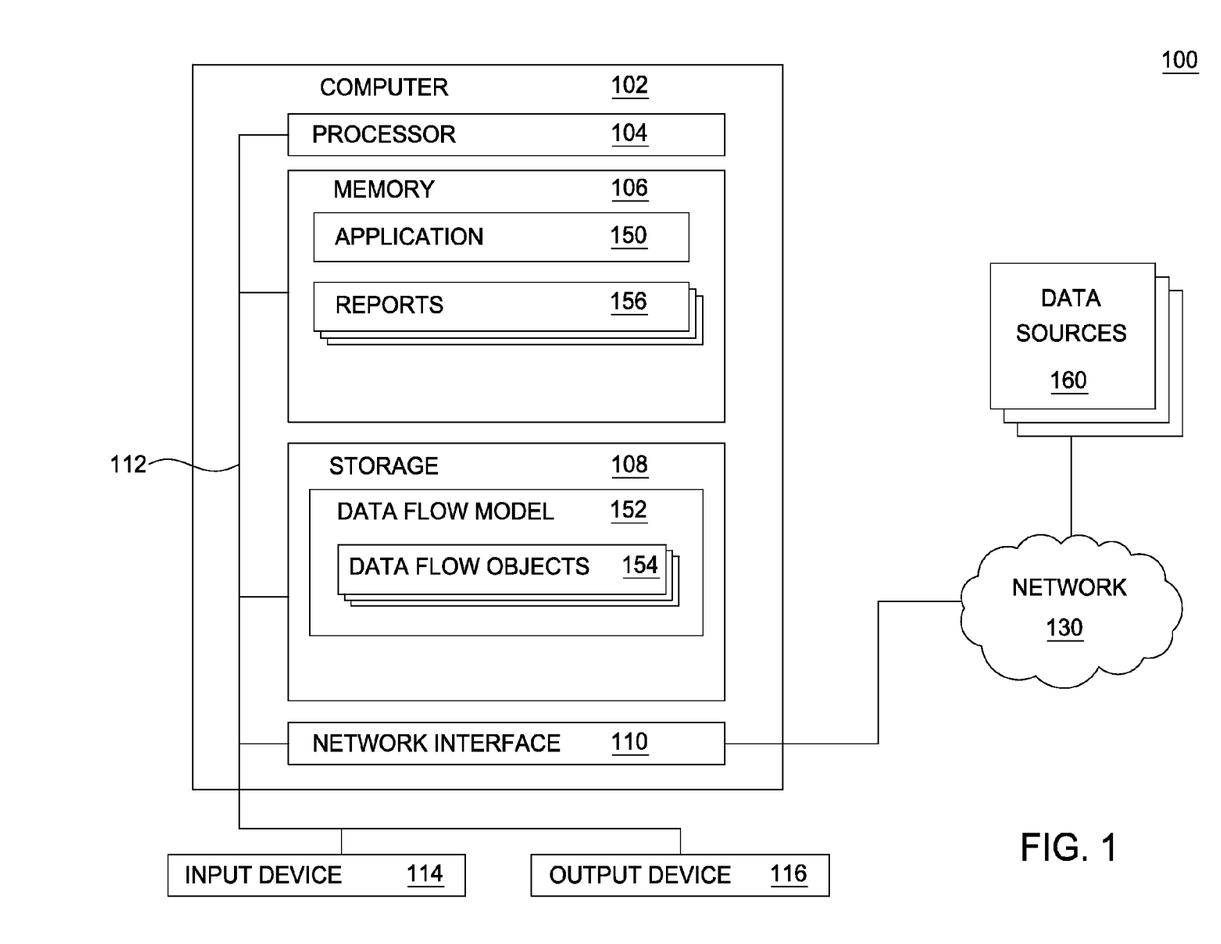
FIG. 1 is a block diagram illustrating a system for cost modeling, according to one embodiment of the invention.

FIG. 1 is a block diagram illustrating a system 100 for cost modeling, according to one embodiment of the invention. The networked system 100 includes a computer 102 that is connected to data sources 160 via a network 130. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes an application 150 for modeling costs and reports 156 generated from the data sources 160. In one embodiment, the application 150 generates a data flow model 152, which includes a plurality of data flow objects 154. The data flow model 152 may be generated based on interdependencies between the reports 156 and the data sources 160. Each data flow object may represent an information asset such as a data source 160, a report 156, a database application, an ETL process, etc. The ETL process may extract data from any data source, including a relational database, a flat file, a web form, etc. Each data flow object may include one or more data units. Each data unit is a subset of data accessed by and/or stored by the respective data flow object. At least in some embodiments, each subset of data is disjoint. In other embodiments, at least some of the subsets of data may overlap. For instance, one or more rows, columns and/or tables of data may be common to two or more subsets of data.

In one embodiment, the application 150 determines a cost property for each data unit in the data flow model 152. The cost property may be determined from at least two components: a first component characterizing a data quality of the data unit and a second component characterizing a data cost of the data unit. Each component may be determined by evaluating data in the data unit based on one or more predefined rules. Additionally or alternatively, each component may be determined at least in part based on user input. Once the cost property has been determined for each data unit of a given data flow object 154, then the application 150 may determine a cost property for the given data flow object 154. Alternatively, at least for some data flow objects 154, the cost property may be determined by evaluating in a similar fashion as for data units—namely, from a data quality component and a data cost component. Based on the cost properties, the application 150 or a user may identify which information assets are costlier than others, in terms of impact of poor data quality. The user may modify the data quality component or data cost component of any cost property, to identify which information assets are more cost effective to upgrade than others, in terms of reducing costliness of information assets.

Figure 2:
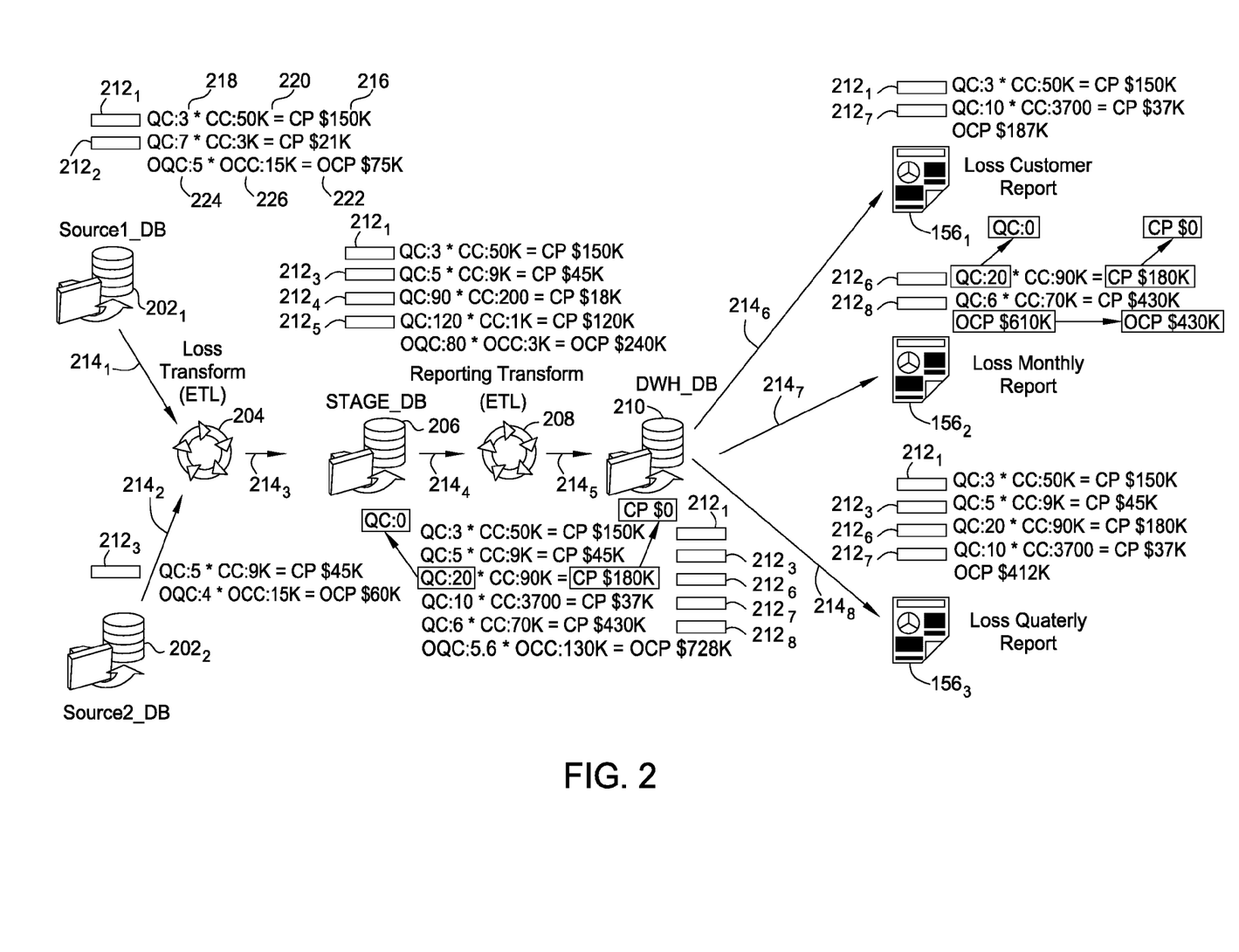
FIG. 2 illustrates a data flow model, according to one embodiment of the invention.

FIG. 2 illustrates the data flow model 152 of FIG. 1, according to one embodiment of the invention. As shown, the data flow model 152 includes a plurality of data flow objects, each representing a respective information asset. The data flow objects include a first source database $202_1$, a second source database $202_2$, a first ETL process 204, a staging database 206, a second ETL process 208, a data warehouse 210 and reports $156_{1-3}$. Each information asset includes one or more data units. The data flow model 152 also specifies interdependencies between the information assets, in the form of arrows 214 between the data flow objects. As shown, the arrows $214_{6-8}$ specify that the reports $156_{1-3}$ retrieve data from the data warehouse 210. The arrow $214_5$ specifies that the data warehouse 210 stores data received from second ETL process 208. The arrow $214_4$ specifies that the second ETL process 208 retrieves data from the staging database 206. The arrow $214_3$ specifies that the staging database 206 stores data received from the first ETL process 204. The arrows $214_{1-2}$ specify that the first ETL process 204 retrieves data from the source databases $202_{1-2}$.

In one embodiment, the data flow model 152 further specifies data units 212 included in each data flow object. As described above, each data unit represents a subset of data stored and/or accessed by the information asset. Further, each data unit is identifiable based on respective criteria. For example, a data unit may correspond to a table, a set of tables, a database namespace, a column or group of columns, a row or group of rows, a cell or group of cells, a file or group of files, etc. The criteria may correspond to a table names, namespace names, column names, row identifiers and/or predefined query conditions. In one embodiment, each data unit corresponds to a distinct table in a database.

As shown, the first source database $202_1$ stores the data units $212_{1-2}$. The second source database $202_2$ stores the data unit $212_3$. The staging database 206 stores data units $212_{4-5}$. The staging database 206 also stores the data units $212_1$, $212_3$, which are received from the source databases 202 via the first ETL process 204. The data warehouse 210 stores the data units $212_{6-8}$. The data warehouse 210 also stores the data units $212_1$, $212_3$, which are received from the staging database 206 via the second ETL process 208. The first report $156_1$ retrieves the data units $212_{1,7}$ from the data warehouse 210. The second report $156_2$ retrieves the data units $212_{6,8}$ from the data warehouse 210. The third report 156 retrieves the data units $212_{1,3,6,7}$ from the data warehouse 210.

In one embodiment, the application 150 determines a cost property (CP) 216 for each data unit in the data flow model 152. The cost property 216 may be for a data unit may be determined based on a predefined formula and from at least two components: a quality component (QC) 218 and a cost component (CC) 220. The quality component 218 stores a measure of data quality of the respective data unit. In some embodiments, the quality component 218 may be viewed as measuring an extent and/or severity of poor data quality in the data unit. Additionally or alternatively, the quality component 218 may be viewed as measuring a degree of good data quality in the data unit. At least in some embodiments, good data quality and bad data quality can be represented as opposite ends of a predefined range of values representing data quality. The cost component 220 stores a measure of costliness of poor data quality in the respective data unit. In some embodiments, the cost component 220 may also be viewed as a measure of return on investment (ROI) for improving data quality in the respective data unit. In other embodiments, the cost component 220 may be viewed as a measure of relative value of a data unit to an organizational entity, relative to other data units.

In one embodiment, the predefined formula specifies to multiply the quality component 218 by the cost component 220 to obtain the cost property 216 of a data unit. A user may customize the predefined formula to suit the needs of a particular case. In another embodiment, each of the quality component 218 and the cost component 220 may be weighted—i.e., multiplied by a respective coefficient.

In one embodiment, the application 150 determines the quality component 218 for a data unit, by evaluating one or more predefined data quality rules against the data unit to compute a score. Each data quality rule specifies a respective data constraint. For example, a first rule may specify that a field representing a social security number (SSN) should be numeric and include at least ten digits. In some embodiments, the first rule may also specify that the field should adhere to a predefined format of "XXX-XXX-XXXX," where "X" represents a digit, and where a dash ("-") is a predefined delimiter character. A second rule may specify that a field representing age should be numeric and non-negative. A user may customize the predefined rules to suit the needs of a particular case.

In one embodiment, to compute the score, the application 150 evaluates each rule against each row or cell in the data unit. In one embodiment, a higher score represents a reduced quality of data, while a lower score represents an improved quality of data. In one embodiment, the score may represent a count of rules violated per row or cell of data in the data unit. In an alternative embodiment, the score represents a total count of rows in the data unit that violate a predefined number of rules. In some embodiments, the score is normalized to a predefined range of score values, such as from zero to two hundred. The application then returns the normalized score as the quality component 218 for the data unit. As shown, the quality components 218 of the data units $212_{1-8}$ are given by the numerical scores of 3, 7, 5, 90, 120, 20, 10 and 6, respectively. In some embodiments, one or more of the quality components 218 may be specified via user input.

Additionally or alternatively, in one embodiment, the application 150 may also determine the quality component 218 for a data unit, based on metadata characterizing quality of the underlying data and/or a data source providing the underlying data. The metadata may be stored by an application configured to monitor quality of data received from various sources.

In one embodiment, the application 150 associates each data unit with the cost component 220. Each cost component 220 may be user-specified or programmatically determined. For example, the cost component 200 may be determined based on metadata characterizing significance of the underlying data and/or a data source providing the underlying data. The cost component 200 may also be determined based on a size of the data unit. Depending on the embodiment, the cost component 200 may be directly proportional or inversely proportional to the size of the data unit, depending on whether a small size or a large size is deemed to more significantly influence downstream data flow objects that access a given data unit. The cost component 200 may also be determined based on metadata characterizing an extent to which the underlying data of a given data unit complies with regulatory requirements, such as privacy and/or security regulations. As shown, the cost components 220 of the data units $212_{1-8}$ are given by the monetary values of 50K, 3K, 9K, 0.2K, 1K, 9K, 3.7K and 70K, respectively. In this particular example, the monetary values are measured in dollars.

In one embodiment, based on the quality component 218 and cost component 220 of each data unit, the application 150 determines the cost property 216 for the respective data unit. As described above, the cost property 216 may be determined using a predefined formula, such as one that specifies to multiply the quality component 218 by the cost component 220 to obtain the cost property 216. As shown, the cost properties 216 of the data units $212_{1-8}$ are given by the monetary values of 150K, 21K, 45K, 18K, 120K, 180K, 37K and 430K, respectively.

In one embodiment, once the application 150 has determined the cost property 216 for each data unit in the data flow model 152, the application 150 may additionally determine a cost property for each data flow object in the data flow model 152. The cost property for a data flow object may also be referred to herein as an object cost property (OCP). The object cost property may be determined using a predefined formula, such as one that specifies to sum cost properties of all data units in the data flow object. For example, an object cost property of 187K may be determined for the report $156_1$ by summing the cost properties of the data units $212_1$ and $212_7$—namely, the monetary values of 150K and 37K.

In one embodiment, the object cost property may also be determined differently for other data flow objects, depending on object type. For example, the cost property of data sources may be determined independently of cost properties of data units in the data sources. For instance, the application 150 may determine an object cost property 222 of 75K for the first data source $202_1$, based on an object quality component (OQC) 224 and an object cost component (OCC) 226. The object quality component 224 and the object cost component 226 may each be determined by evaluating the one or more predefined rules against the data flow object—i.e., the first data source $202_1$ in this case. In this regard, the object quality component 224 is not necessarily determined based on the quality components 218 of the data units in the first data source $202_1$. Similarly, the object cost component 226 is not necessarily determined based on the cost components 220 of the data units in the first data source $202_1$. A user of the application 150 may tailor the way of determining the object cost property for each given object type, to suit the needs of a particular case.

Advantageously, once the cost properties and object cost properties are determined, a user of the application 150 may identify information assets that are costlier than others, in terms of impact of poor data quality to the organizational entity. The cost properties and/or object cost properties may be used to identify which information assets are more cost effective to update than others from an ROI standpoint, in terms of reducing costliness of information assets. Further, the object cost properties and cost properties provide a measure of costliness at multiple levels of granularity—namely, at both a data flow object level and a data unit level within a data flow object. Accordingly, users of the application 150 may make better-informed decisions when prioritizing upgrades to the information assets.

In one embodiment, a user may desire to adjust quality components and/or cost components and view updated cost properties and/or object cost properties based on the adjusted components. The updated cost properties and/or object cost properties may also be used to identify which information assets are more cost effective to update than others from an ROI standpoint, in terms of reducing costliness of information assets. At least in some embodiments, the application 150 also allows the user to revert back to previous cost properties and/or object cost properties, thereby allowing the user to "undo" the adjustments made. Advantageously, users of the application 150 may experiment with various adjustments to the components to better identify information assets are more cost effective to update than others. Put another way, the application 150 allows users to simulate updating information assets, to identify information assets that are cost-effective to update.

For example, suppose a user changes the quality component of the data unit $212_6$ in the data warehouse 210. Assume that the quality component is changed from a value of twenty to a value of zero. In response to the change, the application 150 updates the cost property of the data unit $212_6$. In this particular example, the cost property is changed from a value of 180K to a value of zero. Depending on the embodiment, the application 150 may also recalculate the object cost property of the data warehouse 210. In this particular example, the object cost property remains unchanged. The application 150 may also update the object cost property of any information assets that rely on the data unit $212_6$, thereby propagating changes throughout the data flow model 152. For instance, the application 150 updates the object cost property of the report $156_2$, based on the change. In this particular example, the object cost property of the report $156_2$ is changed from 610K to 430K. Accordingly, by using the application 150, the user may determine that upgrading the data warehouse 210 to improve data quality of the data unit $212_6$ may result in a cost savings of 180K. In this particular example, the cost savings is measured in dollars. In cases where the cost savings of 180K is determined to be higher than the cost savings of other data flow objects, the user may determine to proceed with upgrading the data warehouse 210 to improve data quality of the data unit $212_6$. In cases where the cost savings of 180K is determined to be lower than the cost savings of other data flow objects, the user may determine to avoid upgrading, at least for the time being, the data warehouse 210 at least in regards to improving data quality of the data unit $212_6$.

Figure 3:
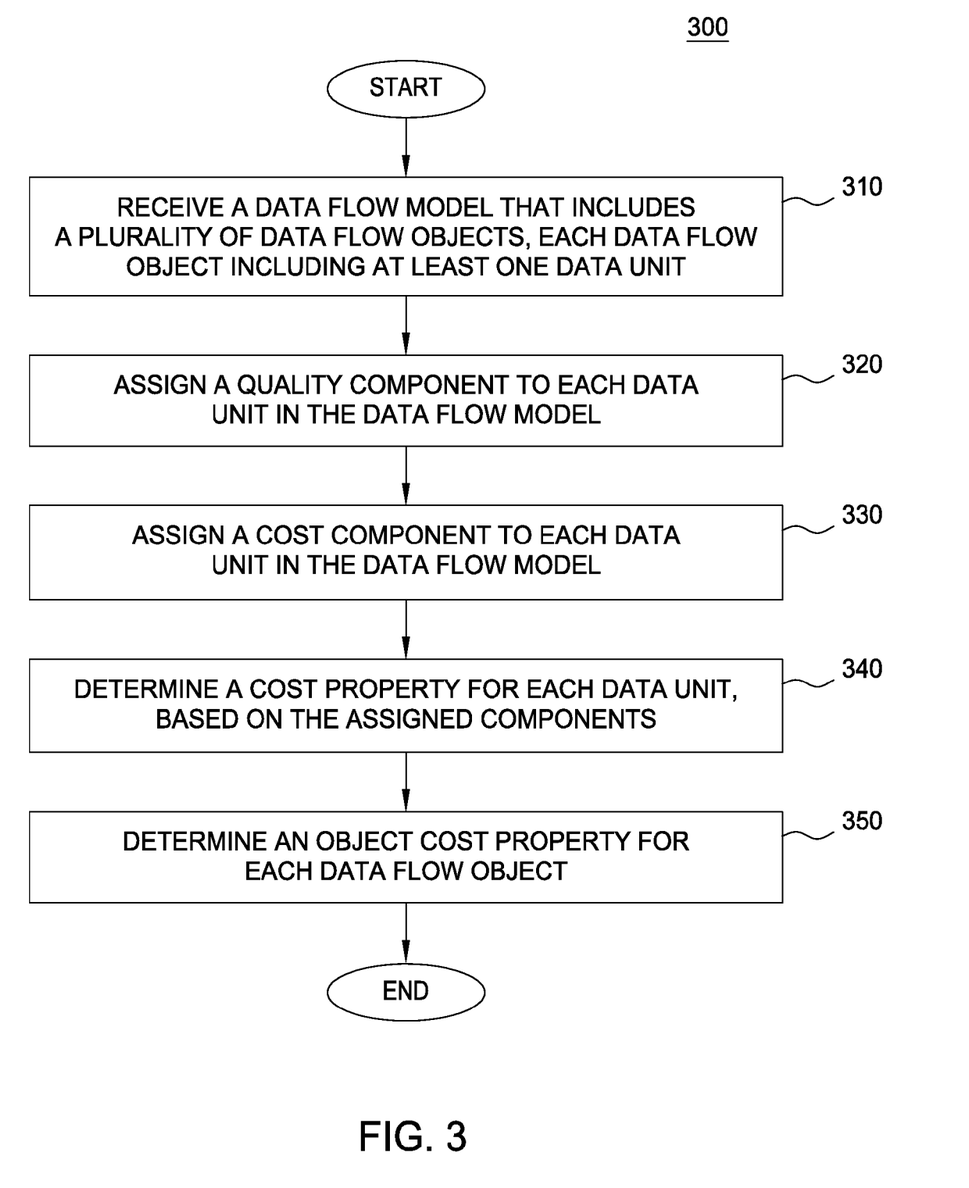
FIG. 3 is a flowchart depicting a method for cost modeling for information assets, according to one embodiment of the invention.

FIG. 3 is a flowchart depicting a method 300 for cost modeling for information assets, according to one embodiment of the invention. As shown, the method 300 begins at step 310, where the application 150 receives a data flow model that includes multiple data flow objects. Each data flow object represents a respective information asset and includes at least one data unit. At step 320, the application 150 assigns a quality component to each data unit in the data flow model. For instance, the application 150 may assign a quality component of twenty to the data unit $212_6$. At step 330, the application 150 assigns a cost component to each data unit in the data flow model. For instance, the application 150 may assign a quality component of 9K to the data unit $212_6$. At step 340, the application 150 determines a cost property for each data unit, based on the assigned components. For instance, the application 150 may determine a cost property of 180K for the data unit $212_6$. At step 350, the application 150 determines an object cost property for each data flow object. For instance, the application 150 may determine an object cost property of 728K for the data warehouse 210. After the step 350, the method 300 terminates.

Figure 4:
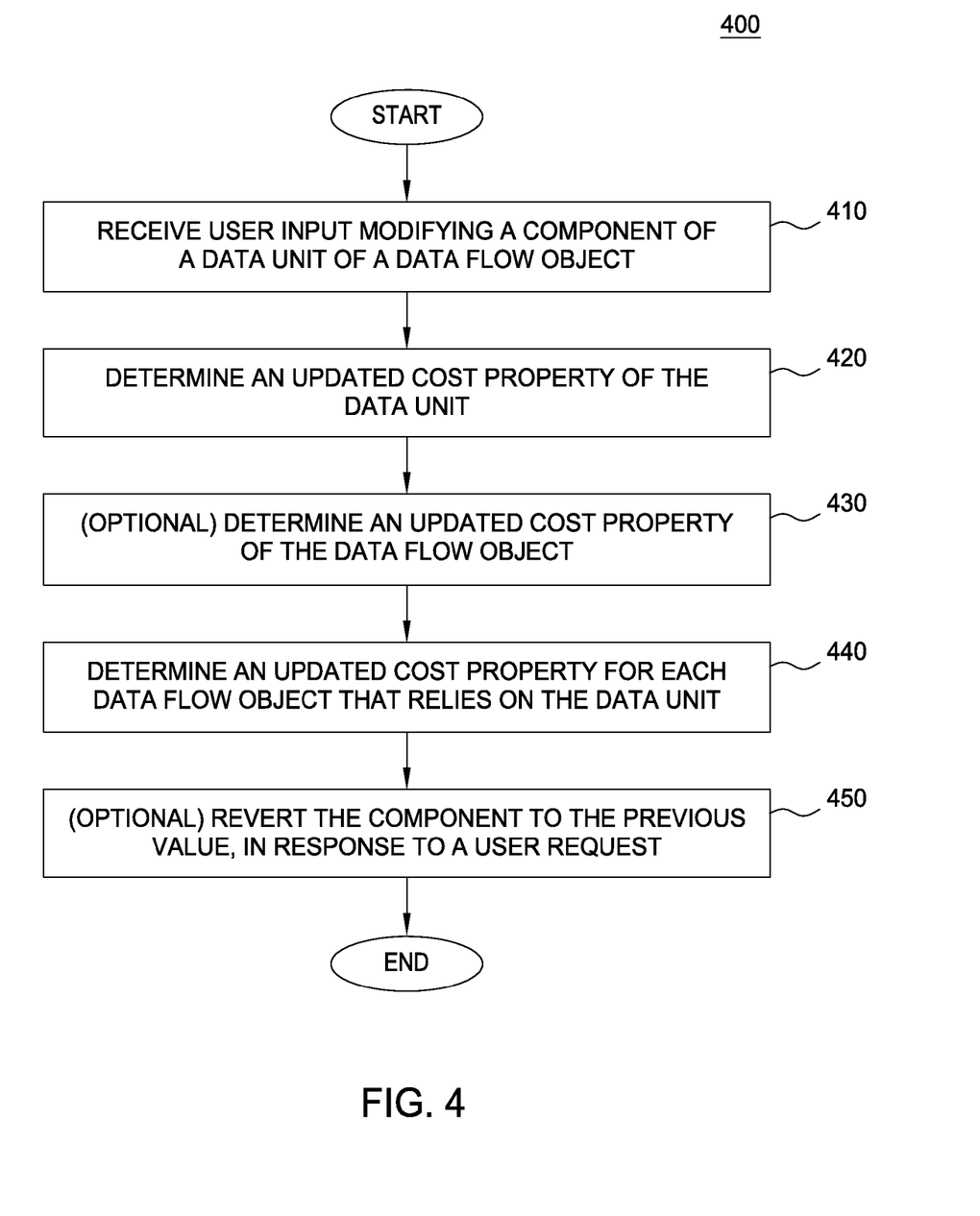
FIG. 4 is a flowchart depicting a method for cost modeling using modified components, according to one embodiment of the invention.

FIG. 4 is a flowchart depicting a method 400 for cost modeling using modified components, according to one embodiment of the invention. As shown, the method 400 begins at step 410, where the application 150 receives user input modifying the quality component or the cost component of a data unit of a data flow object in the data flow model. For example, the application 150 may receive user input modifying the quality component of the data unit $212_6$ from a value of twenty to a value of zero. At step 420, the application 150 determines an updated cost property of the data unit, based on the modified component. For example, the application 150 may determine an updated cost property of zero for the data unit $212_6$. At step 430, the application 150 optionally determines an updated cost property of the data flow object. At step 440, the application 150 determines an updated cost property for each data flow object that relies on the data unit. For example, the application 150 may determine an updated cost property of 430K for the report $156_2$. At step 450, the application 150 optionally reverts the component to the previous value, in response to a user request. For example, the application 150 may revert the quality component of the data unit $212_6$ back to a value of twenty. At the step 450, the application 150 may also revert all updated cost properties and/or object cost properties back to previous values. For example, the application 150 may revert the object cost property of the report $156_2$ back to 610K. After the step 450, the method 400 terminates.

Although embodiments herein are described with respect to determining a cost property based on a quality component and a cost component, other embodiments are broadly contemplated. For example, in an alternative embodiment, the cost property may be determined based further on a quantity component that represents an amount of underlying data in a given data unit. In another alternative embodiment, the cost property may be determined further based on a second quality component representing an extent to which the underlying data is corrupted as a result of one or more predefined scenarios. For example, the predefined scenarios may include physical disk failures, redundant array of independent disks (RAID) controller errors, inadvertent or malicious tampering of data by a user, corruption of data by malware, etc. Depending on the embodiment, the second quality component may be determined by the application described herein or by a separate application configured to detect corrupted data. In still other embodiments, only a single, combined cost component is determined, and data corruption as a result of the one or more predefined scenarios is accounted for in determining the combined cost component.

Further, in one embodiment, when a data unit is identified as corrupted at a given data source, the application may also evaluate whether a copy of the data unit is stored at an upstream and/or downstream data source. During this evaluation, the application may also determine an extent to which the copy of the data unit in the upstream or downstream data source is considered up-to-date (or stale). The copy may be considered to be up-to-date if the data unit was last refreshed within a predefined time period, e.g., less than sixty days prior to the current system time. Based on the extent to which the copy is considered up-to-date, the application may determine and/or adjust the quality component(s) associated with the data unit. In some embodiments, the application may also evaluate the staleness of other data units in a data flow model, to determine an overall measure characterizing an extent to which the data flow model is considered to be up-to-date, in terms of data stored by the data flow objects in the data flow model.

Advantageously, embodiments of the invention provide techniques for cost modeling of information assets. One embodiment provides an application that receives a data flow model that includes multiple data flow objects. Each data flow objects include one or more data units. Each data unit is retrievable based on respective, predefined criteria. The application assigns a quality component and a cost component to a first data unit of a first data flow object. The application then determines a cost property for the first data unit, based on the assigned components. The application may also determine an object cost property for the first data flow object, based on one or more cost properties for data units in the first data flow object. Advantageously, the application and/or a user may identify which information assets are costlier than others, in terms of impact of inadequate data quality to the organizational entity. At least in some cases, the user may prioritize allocation of resources of the organizational entity toward upgrading information assets that are deemed more cost-effective to upgrade, relative to other information assets.

While the foregoing is directed to embodiments of the present invention, other and further embodiments of the invention may be devised without departing from the basic scope thereof, and the scope thereof is determined by the claims that follow.

What is claimed is:

1. A computer-implemented method of data flow cost modeling, the method comprising:
   receiving a data flow model comprising a plurality of data flow objects, each data flow object including one or more data units, each data unit being retrievable based on respective, predefined criteria;
   assigning a quality component to a first data unit of a first data flow object of the plurality of data flow objects, wherein the quality component characterizes data quality in the first data unit;
   assigning a cost component to the first data unit of the first data flow object, wherein the cost component characterizes a costliness of inadequate data quality in the first data unit; and
   determining a cost property to assign to the first data flow object, based on the quality component and the cost component, and by operation of one or more computer processors.

2. The computer-implemented method of claim 1, further comprising:
   determining a cost property to assign to a second data flow object that accesses the first data unit of the first data flow object.

3. The computer-implemented method of claim 2, further comprising:
   receiving user input modifying a component, wherein the component is selected from the quality component and the cost component of the first data unit of the first data flow object; and
   determining an updated cost property for at least one of the first data flow object and the second data flow object, based on the modified component.

4. The computer-implemented method of claim 3, wherein each data flow object represents a respective information asset.

5. The computer-implemented method of claim 4, wherein the cost property is expressed in terms of monetary cost.

6. A computer program product for data flow cost modeling, the computer program product comprising:
   a computer-readable storage medium having computer-readable program code embodied therewith, the computer-readable program code comprising:
      computer-readable program code configured to receive a data flow model comprising a plurality of data flow objects, each data flow object including one or more data units, each data unit being retrievable based on respective, predefined criteria;
      computer-readable program code configured to assign a quality component to a first data unit of a first data flow object of the plurality of data flow objects, wherein the quality component characterizes data quality in the first data unit;
      computer-readable program code configured to assign a cost component to the first data unit of the first data flow object, wherein the cost component characterizes a costliness of inadequate data quality in the first data unit; and
      computer-readable program code configured to determine a cost property to assign to the first data flow object, based on the quality component and the cost component, and by operation of one or more computer processors when executing the computer-readable program code.

7. The computer program product of claim 6, wherein the computer-readable program code further comprises:
   computer-readable program code configured to determine a cost property to assign to a second data flow object that accesses the first data unit of the first data flow object.

8. The computer program product of claim 7, wherein the computer-readable program code further comprises:
   computer-readable program code configured to receive user input modifying a component, wherein the component is selected from the quality component and the cost component of the first data unit of the first data flow object; and
   computer-readable program code configured to determine an updated cost property for at least one of the first data flow object and the second data flow object, based on the modified component.

9. The computer program product of claim 8, wherein each data flow object represents a respective information asset.

10. The computer program product of claim 9, wherein the cost property is expressed in terms of monetary cost.

11. A system for data flow cost modeling, the system comprising:
    one or more computer processors;
    a memory containing a program, which when executed by the one or more computer processors is configured to perform an operation comprising:
       receiving a data flow model comprising a plurality of data flow objects, each data flow object including one or more data units, each data unit being retrievable based on respective, predefined criteria;

assigning a quality component to a first data unit of a first data flow object of the plurality of data flow objects, wherein the quality component characterizes data quality in the first data unit;

assigning a cost component to the first data unit of the first data flow object, wherein the cost component characterizes a costliness of inadequate data quality in the first data unit; and determining a cost property to assign to the first data flow object, based on the quality component and the cost component.

12. The system of claim 11, wherein the operation further comprises:

determining a cost property to assign to a second data flow object that accesses the first data unit of the first data flow object.

13. The system of claim 12, wherein the operation further comprises:

receiving user input modifying a component, wherein the component is selected from the quality component and the cost component of the first data unit of the first data flow object; and determining an updated cost property for at least one of the first data flow object and the second data flow object, based on the modified component.

14. The system of claim 13, wherein each data flow object represents a respective information asset.

15. The system of claim 14, wherein the cost property is expressed in terms of monetary cost.

16. The system of claim 15, wherein the cost property characterizes a costliness of inadequate data quality in the first data flow object, wherein each costliness comprises a costliness to an organizational entity, wherein the first data flow object includes a second data unit, wherein the plurality of data flow objects of data flow model includes a third data flow object having a third data unit and a fourth data unit, wherein each data unit is generated by a different application of a plurality of distinct applications.

17. The system of claim 16, wherein determining the cost property to assign to the first data flow object comprises:

assigning a respective quality component to each of the second, third, and fourth data units;

assigning a respective cost component to each of the second, third, and fourth data units;

determining a respective cost property to assign to each of the first, second, third, and fourth data units, and as a first predefined function of the quality component and the cost component assigned to the respective one of the first, second, third, and fourth data units.

18. The system of claim 17, wherein the cost property to assign to the first data flow object is determined as a second predefined function of the cost properties to assign to the first and second data units, wherein a cost property to assign to the third data flow object is determined as the second predefined function of the cost properties to assign to the third and fourth data units, thereby providing measures of cost at multiple levels of granularity of the data flow model, including a data flow object level of granularity and a data unit level of granularity, wherein each quality component, each cost component, and each cost property comprises a distinct value, wherein each predefined function comprises a distinct function.

19. The system of claim 18, wherein the first predefined function specifies to multiply the quality component by the cost component, wherein the second predefined function specifies to sum the cost properties of the data units included in a given data flow object, wherein each data unit is generated by a distinct application of the plurality of applications, wherein the operation further comprises:

designating the application configured to generate a data unit of the first, second, third and fourth data units, having a highest cost property, as having a highest priority for upgrade or replacement, relative to other applications; and designating the application configured to generate another data unit of the first, second, third and fourth data units, having a second-highest cost property, as having a second-highest priority for upgrade or replacement, relative to other applications;

thereby prioritizing resource allocation pertaining to upgrade or replacement of the plurality of applications, based on cost effectiveness as measured by the cost properties of the data units.

20. The system of claim 19, wherein the system is for prioritizing upgrade or replacement of the plurality of applications based on cost effectiveness according to the cost properties of the data units, wherein the data flow model includes each data flow object selected from a data source, a data processing application, and a report, wherein the data processing application comprises an extract, transform, and load (ETL) application;

wherein the cost property to assign to the first data flow object is determined by a cost modeling application, wherein the cost modeling application is configured to determine at least one quality component based on one or more predefined data quality rules, wherein the cost modeling application is further configured to determine at least one quality component based on input specified by a user of the cost modeling application, wherein the cost modeling application is configured to determine at least one cost component based on one or more predefined costing rules different from the one or more predefined data quality rules specifying data constraints to be met, wherein the cost modeling application is further configured to determine at least one cost component based on input specified by a user of the cost modeling application;

wherein at least one quality component represents an average count of data quality rules violated per row of data in a data unit, wherein at least one other quality component represents an average count of data quality rules violated per column of data in a data unit, wherein at least one still other quality component represents an average count of data quality rules violated per cell of data in a data unit, wherein at least one quality component of a data unit is adjusted based on whether an upstream copy of the data unit was last refreshed within a predefined time period, wherein at least one other quality component of a data unit is adjusted based on whether a downstream copy of the data unit was last refreshed within the predefined time period.

* * * * *